United States Patent
Karpa et al.

(10) Patent No.: US 9,405,559 B2
(45) Date of Patent: Aug. 2, 2016

(54) EFFICIENT METHOD OF DECOUPLING THE DOWNLOADING OF A MEMORY MAP AND EXECUTION OF A UTILITY PROGRAM CONTAINED IN THE MEMORY MAP

(75) Inventors: Wolfgang Karpa, Delbrück (DE); Lothar Arnold, Delbrück (DE); Helmut Emmerich, Altenbeken (DE); Walter Unruh, Bad Salzuflen (DE)

(73) Assignee: Fujitsu Limited (JP)

( * ) Notice: Subject to any disclaimer, the term of this patent is extended or adjusted under 35 U.S.C. 154(b) by 670 days.

(21) Appl. No.: 13/811,513

(22) PCT Filed: May 27, 2011

(86) PCT No.: PCT/EP2011/058710
§ 371 (c)(1),
(2), (4) Date: Mar. 25, 2013

(87) PCT Pub. No.: WO2012/010354
PCT Pub. Date: Jan. 26, 2012

(65) Prior Publication Data
US 2013/0219398 A1    Aug. 22, 2013

(30) Foreign Application Priority Data
Jul. 23, 2010 (DE) .................. 10 2010 032 040

(51) Int. Cl.
*G06F 9/46* (2006.01)
*G06F 9/455* (2006.01)
*G06F 9/445* (2006.01)

(52) U.S. Cl.
CPC *G06F 9/445* (2013.01); *G06F 8/65* (2013.01); *Y02B 60/183* (2013.01)

(58) Field of Classification Search
None
See application file for complete search history.

(56) References Cited

U.S. PATENT DOCUMENTS

| 6,308,325 | B1 | 10/2001 | Dobbek | |
|---|---|---|---|---|
| 8,694,991 | B2 * | 4/2014 | Bonola | G06F 8/61 718/1 |
| 2003/0014562 | A1 * | 1/2003 | Noyle | 709/328 |
| 2004/0012596 | A1 * | 1/2004 | Allen et al. | 345/501 |
| 2005/0046627 | A1 * | 3/2005 | Noyle | 345/419 |
| 2005/0193229 | A1 * | 9/2005 | Garg et al. | 714/4 |
| 2009/0006834 | A1 | 1/2009 | Rothman et al. | |

FOREIGN PATENT DOCUMENTS

| JP | 2002-215375 | 8/2002 |
|---|---|---|
| JP | 2002-244874 | 8/2002 |
| JP | 2004-29876 | 1/2004 |
| JP | 2010-9474 | 1/2010 |
| WO | 99/32968 A2 | 7/1999 |

OTHER PUBLICATIONS

Japanese Office Action dated Feb. 12, 2004 for corresponding Japanese Application No. 2013-520022.

* cited by examiner

*Primary Examiner* — Meng An
*Assistant Examiner* — Bradley Teets
(74) *Attorney, Agent, or Firm* — DLA Piper LLP (US)

(57) ABSTRACT

A method of executing a utility program on a computer system having a system management chip includes activating a graphics memory in the computer system, downloading a memory map including the utility program to be executed by the system management chip, storing the memory map in the graphics memory by the system management chip, copying the memory map from the graphics memory to a main memory in the computer system, and executing the utility program with a processor in the computer system.

13 Claims, 3 Drawing Sheets

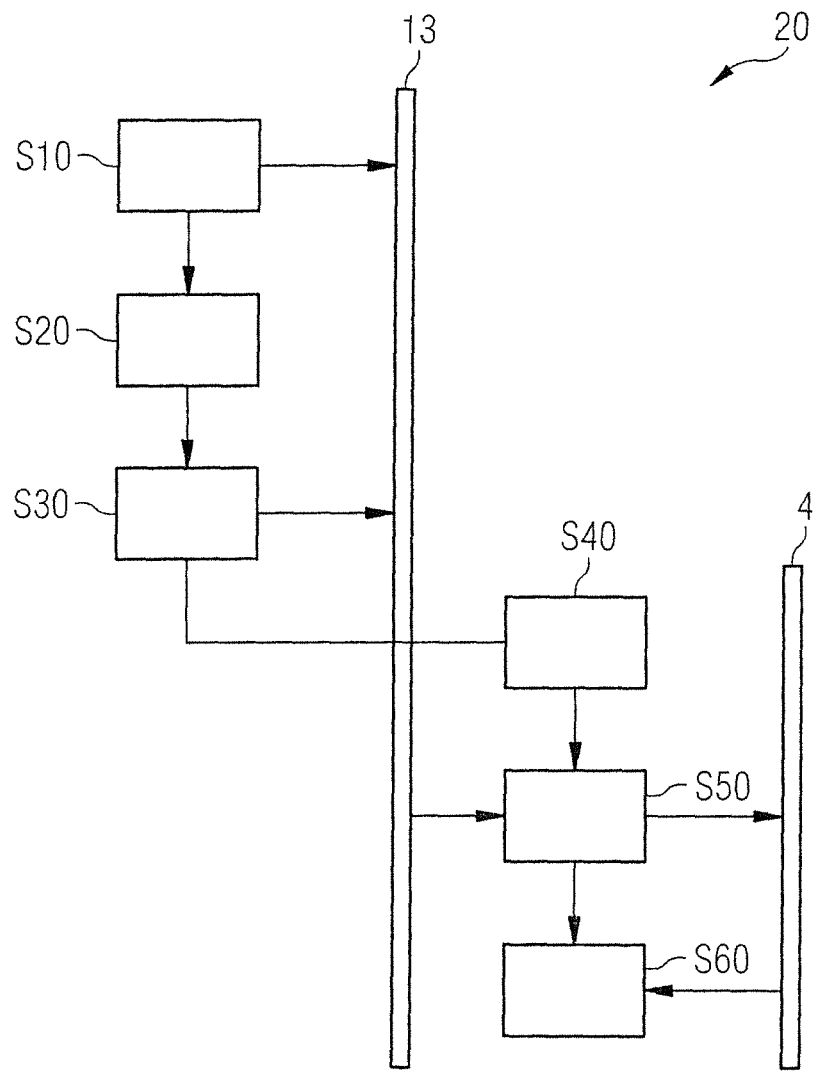

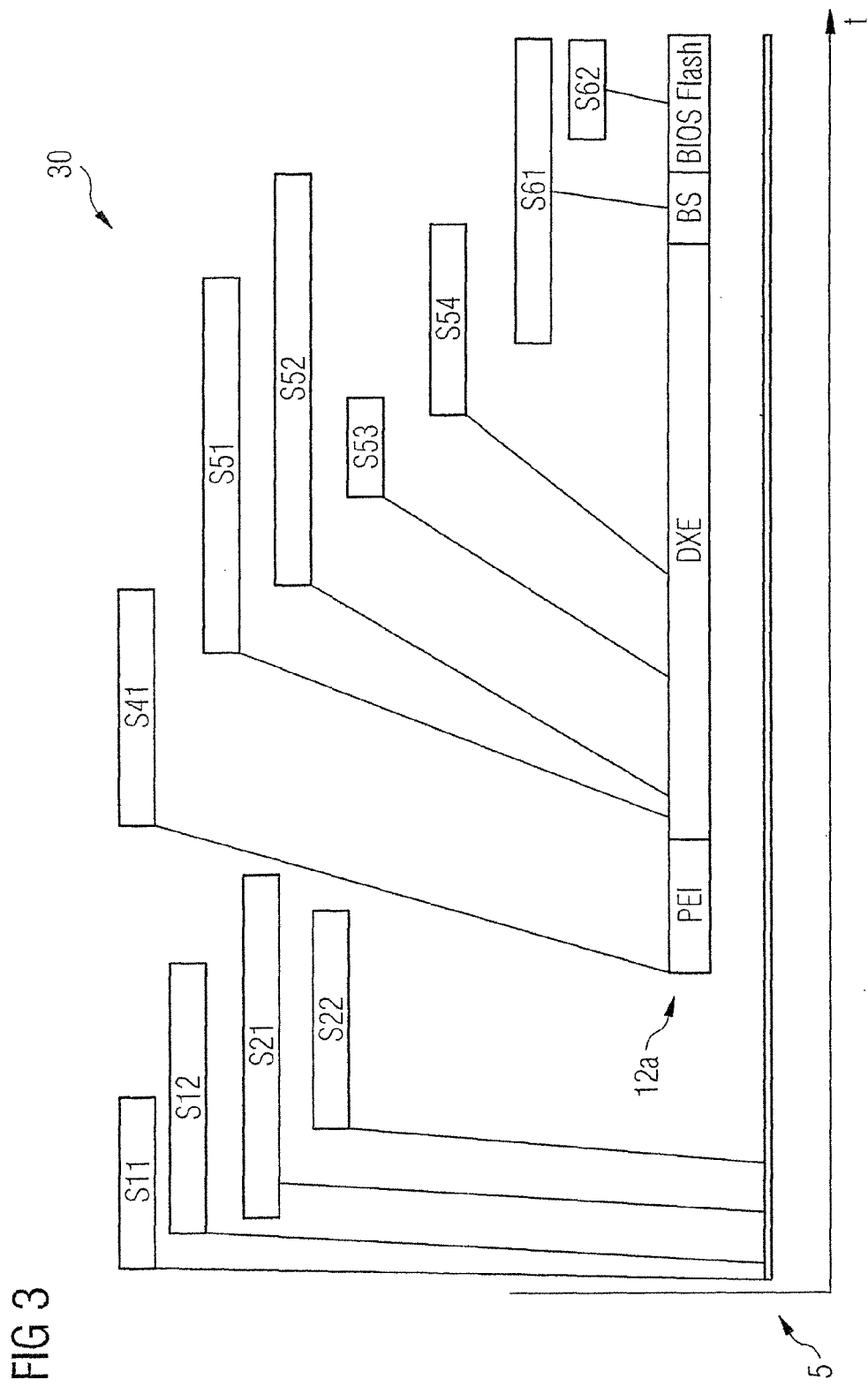

EFFICIENT METHOD OF DECOUPLING THE DOWNLOADING OF A MEMORY MAP AND EXECUTION OF A UTILITY PROGRAM CONTAINED IN THE MEMORY MAP

RELATED APPLICATIONS

This is a §371 of International Application No. PCT/EP2011/058710, with an international filing date of May 27, 2011 (WO 2012/010354 A1, published Jan. 26, 2012), which is based on German Patent Application No. 10 2010 032 040.4, filed Jul. 23, 2010, the subject matter of which is incorporated herein by reference.

TECHNICAL FIELD

This disclosure relates to a method for executing a utility program on a computer system having a system management chip, a computer system and a computer program product which are set up to execute such a method.

BACKGROUND

Computer systems having a system management chip, also known as a baseboard management controller (BMC) or remote management controller (RMC), are known particularly from the field of high-performance server computers. In this context, the system management chip is used for different purposes. First, it monitors the correct operation of one or more processors or other components of the computer system to recognize errors that occur and restart the computer system if necessary. Furthermore, the system management chip is also used for remote maintenance of the computer system. For this purpose, such systems are often equipped with a network interface which allows extensive configuration of the computer system by a system administrator using a maintenance computer.

One exemplary maintenance task is the installation of new firmware components for the computer system. Firmware is generally understood to mean such software components as are permanently embedded in appropriate hardware chips and provide component-specific functions.

Usually, system components such as a main board in a computer system, but also components such as the system management chip, have nonvolatile memories for this purpose in the form of flash memories. These memories store hardware-specific program code to actuate the relevant components, the program code being available immediately after the start of the respective component and not first needing to be loaded by an operating system from a further storage medium.

Various methods are known to update such firmware components. By way of example, an operating system in the computer system can be started as usual and then a specific utility program to update one or more firmware components can be started. The data used to update can either be obtained by the utility program itself or are transmitted to the computer system in another way. By way of example, updated firmware data may have been loaded from the Internet beforehand or may have been transferred to the computer system by a data storage medium or data network.

Since updating the firmware represents penetrative intervention in the computer system, it is usually not possible to execute further applications on the computer system during this time. In addition, it is usually necessary to restart the computer system after the firmware has been updated. This requires relatively long down times in which a computer system is not available for applications.

It could therefore be helpful to provide a particularly efficient method for executing utility programs, particularly utility programs for updating firmware components. Furthermore, it could be helpful to provide a computer system and a computer program product suitable for executing the method.

SUMMARY

We provide a method of executing a utility program on a computer system having a system management chip, including activating a graphics memory in the computer system, downloading a memory map including the utility program to be executed by the system management chip, storing the memory map in the graphics memory by the system management chip, copying the memory map from the graphics memory to a main memory in the computer system, and executing the utility program with a processor in the computer system.

We also provide a computer system including a first nonvolatile memory that stores a piece of system firmware, at least one processor that executes the system firmware, a main memory, and at least one system monitoring chip which can be operated independently of the processor and has a second nonvolatile memory that stores control program code, wherein the control program code activates a graphics memory in the computer system to download a memory map including a utility program to be executed and store that memory map in the graphics memory, and the system firmware copies the memory map from the graphics memory to the main memory in the computer system and executes the utility program using the at least one processor in the computer system.

BRIEF DESCRIPTION OF THE DRAWINGS

FIG. 2 shows a logical flowchart for a method for executing a utility program.

FIG. 3 shows a temporal flowchart for a method for updating a firmware component.

LIST OF REFERENCE SYMBOLS

Figure 1:
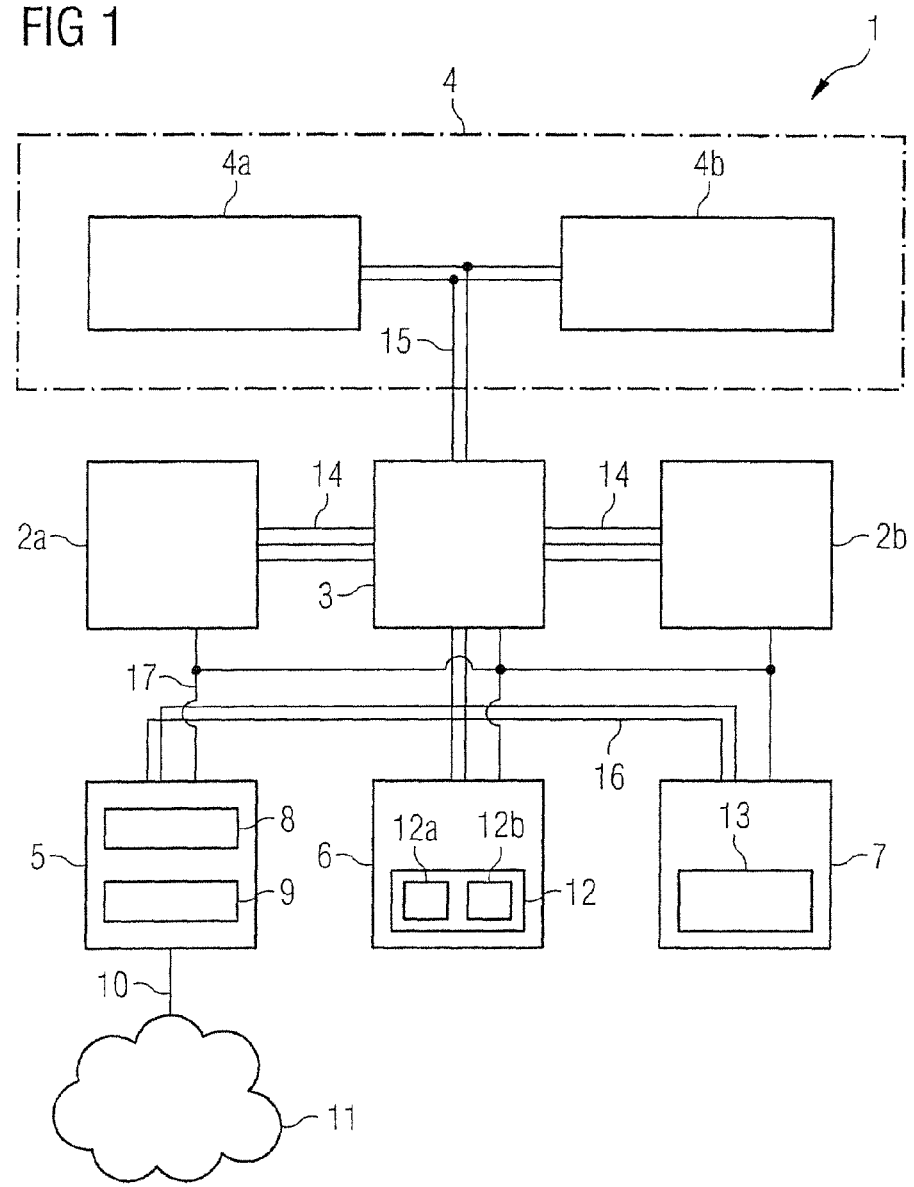
FIG. 1 shows a schematic illustration of an example of system architecture for a computer system.

1 Computer system
2a, 2b Processor
3 Chipset
4 Main memory
4a, 4b Memory module
5 System management chip
6 System module
7 Graphics component
8 Microcontroller
9 Nonvolatile memory
10 Multipurpose connection
11 Data network
12 Nonvolatile memory
12a, 12b Firmware component
13 Graphics memory
14 Processor bus
15 Memory bus
16 Expansion bus
17 System management bus
20 Method for executing a utility program
30 Method for updating a firmware component

DETAILED DESCRIPTION

We provide a method for executing a utility program on a computer system having a system management chip having the following steps:
- a graphics memory in the computer system is activated,
- a memory map comprising the utility program to be executed is downloaded by the system management chip,
- the memory map is stored in the graphics memory by the system management chip,
- the memory map is copied from the graphics memory to a main memory in the computer system, and
- the utility program is executed by a processor in the computer system.

The method is based inter alia on the insight that decoupling the downloading of a memory map and execution of the utility program which the downloaded map contains can make the execution more efficient. In line with the method, this decoupling involves the memory map first being obtained by the system management chip and stored in a graphics memory in the computer system. Only then is the system firmware in the computer system activated and the memory map copied from the graphics memory to the main memory in the computer system. In this way, the copied memory map is available to the computer system a few moments after the system firmware has been activated and can be executed immediately when the system starts.

The utility program to be executed may be set up to update a firmware component in the computer system, particularly the system firmware, and the memory map furthermore contains data for updating the firmware component. If the memory map contains both a utility program to update a firmware component and data to update a firmware component, then firmware components of the computer system can easily be updated without reloading any components that need to be installed.

The step of downloading may involve a packed memory map being loaded and, prior to execution of the utility program, the stored memory map being unpacked by the system firmware. The packing of memory maps allows efficient transfer and handling of the memory map to be transferred in a, possibly compressed, data packet.

The step of copying may be executed prior to activation of a firmware component to initialize a graphics component. If the memory map is executed even before activation of a firmware component for the purpose of initializing a graphics component, it is possible to make use of large portions of the graphics memory, possibly the entire graphics memory, so that it is also possible to process relatively extensive memory maps in our method.

The steps of activating the graphics memory and also downloading and storing the memory map may be executed in a quiescent state of the computer system and the steps of copying the memory map and executing the utility program may be executed in an operating state of the computer system. This has the advantage that the relatively long-winded downloading of the memory map can be carried out in an inactive state of the computer system, for example, overnight or in a break in operation, and the utility program is subsequently available and can be executed immediately when the system starts.

The steps of downloading the memory map may be executed in a prior operating state of the computer system and the steps of activating the graphics memory and storing the memory map are executed when the computer system is restarted and the steps of copying the memory map and executing the utility program take place in an operating state of the computer system which follows the restart. Thus, the requisite memory map is downloaded independently of the operation of the computer system by the system management controller, in the background as it were. Upon a restart subsequently initiated independently thereof, the memory map is then immediately available. This means that the utility program can be executed directly after the restart. This allows minimization of what is known as the down time, that is to say the time in which the computer system is not in an operational state.

Further advantages of our methods and systems are disclosed in the detailed description below and in the appended claims.

FIG. 1 shows a schematic illustration of an example of architecture for a computer system 1 suitable to execute the methods described below.

The computer system 1 in the example comprises two processors 2a and 2b. The example is what is known as a symmetrical multiprocessor system, for example. It goes without saying that the method can also be used in single processor systems or in systems having one or more multicore processors.

The processors 2a and 2b are connected to two memory modules 4a and 4b of a main memory 4 by a chipset 3. The memory modules 4a and 4b are volatile RAM memories. The precise type and arrangement of the memory modules 4a and 4b is irrelevant, however. The memory modules 4a and 4b are used essentially to store data which are currently being processed by one or both of the processors 2a and 2b.

Furthermore, the computer system 1 comprises a system management chip 5, a system module 6 and a graphics component 7. The system management chip 5 comprises a microcontroller 8 and a nonvolatile memory 9. Furthermore, the system management chip 5 connects to a data network 11 by a network connection 10. By way of example, the data network 11 is a local area network (LAN) or the Internet.

The system module 6 comprises various components to operate the computer system. Inter alia, the system module 6 comprises a realtime clock, what is known as a general purpose input/output (GPIO) chip and a nonvolatile memory 12 to store one or more firmware components. By way of example, the nonvolatile memory 12 stores what is known as a BIOS program or components of what is known as an extensible firmware interface (EFI) to initialize the computer system 1. In the example, two firmware components 12a and 12b are shown by way of example. It goes without saying that the various components of the system module 6 can also be arranged wholly or in part in other modules of the computer system 1, particularly in the chipset 3 or the processors 2a and 2b.

The graphics component 7 comprises a graphics processor (not shown) and also a graphics memory 13 that stores graphics data. The graphics memory 13 is usually a volatile memory having particularly short access times. Such a memory is usually called VRAM. The graphics component 7 may either be a portion of an integrated chipset from a main board in the computer system, a graphics chip permanently placed on the main board or a separate graphics component arranged in an expansion slot in the computer system. In this case, the graphics memory 13 can be formed either by separate memory modules or by portions of the memory modules 4a and/or 4b.

In a further configuration (not shown) a computer system comprises what is known as an intelligent server management controller on an I/O riser card in an expansion slot on a main board. The intelligent server management controller comprises, inter alia, a super I/O (SIO) chip, a network connection, a system management chip and a graphics chip. The system management chip comprises an integrated microcontroller, an interrupt controller, a plurality of integrated system management bus drivers, volatile memory and a network interface driver. The graphics chip comprises an integrated graphics core, a PCI memory interface and a memory interface for supporting up to 128 Mbytes of graphics memory. Such an intelligent server management controller comprises all the essential components to carry out the method described below.

The different functional units in the computer system 1 connect to one another by one or more buses. In the example, the chipset 3 connects to the processors 2a and 2b by one or more processor buses 14. Furthermore, the chipset 3 connects to the memory modules 4a and 4b by a memory bus 15. Finally, the chipset 3 connects to the system chip 5, the system module 6 and the graphics component 7 by an expansion bus 16, for example, a parallel PCI bus or serial PCI Express bus. In addition, the processors 2a and 2b, the chipset 3, the system monitoring chip 5, the system module 6 and the graphics component 7 connect to one another by what is known as a system management bus 17, for example, a serial I$^2$C bus. Other proprietary connections are also possible, particularly to connect functional units of integrated components such as the intelligent server management controller described above.

The system management bus 17 works independently of the expansion bus 16 and usually has a smaller bus bandwidth. While the expansion bus 16 is usually used to transfer data in high volume during operation of the computer system, the system management bus 17 is set up to monitor, poll or configure individual components of the computer system 1. To this end, not only the chipset 3 or the processors 2a and 2b, but also the system management chip 5 can take control via the system management bus 17. The system management chip 5 may further be set up to also take control via the expansion bus 16.

The computer architecture described previously is only exemplary in nature. Besides the illustrated switch architecture with a central chipset 3 and largely independently operating bus systems 14, 15, 16 and 17 setting out therefrom, further computer architectures such as hub or bus architectures are also known which combine to execute the methods described below. It is also possible for all components to be directly networked to one another, that is to say for what is known as a direct link to be provided between each of the processors 2a and 2b and the memory modules 4a and 4b and optionally to the further components 5, 7 and 12, for example, to provide particularly powerful system architectures.

FIG. 2 shows a schematic flowchart for a method 20 of executing a utility program on the computer system 1. Method steps S10, S20 and S30 in the left-hand area of FIG. 2 are executed by the microcontroller 8 in the system management chip 5. Method steps S40, S50 and S60 shown in the right-hand portion of FIG. 2 are executed by the processor 2a and/or the processor 2b in the computer system 1. The bars 13 and 4 between and to the right of the blocks of method steps denote the activity of the graphics memory 13 and the main memory 4, respectively.

In method step S10, the system monitoring chip 5 and the graphics memory 13 in the computer system 1 are activated. To this end, the microcontroller 8 in the system management chip 5 is woken by an interrupt, for example. The interrupt can be initiated by an integrated realtime clock in the system management chip 5 or by the reception of what is known as a wake-on LAN (WoL) packet via the data network 11, for example. Subsequently, the graphics memory 13 or the entire graphics component 7 is supplied with an operating voltage. The graphics component 7 or the graphics memory 13 which it contains is actuated by the system management chip 5 via the expansion bus 16, the system management bus 17 or another suitable connection. This is particularly simple when using the graphics memory in the intelligent server management controller described above. Activation of the graphics memory 13 via the expansion bus 16 or the system management bus 17 does not require the processors 2a and 2b to work and hence the supply of power. Instead, the system management chip 5 itself takes control via the bus 16 or 17.

In step S20, the system management chip downloads a packed memory map from a data source in the data network 11. For the method described, it is irrelevant whether the download is initiated by the system management chip 5 itself or by a computer for controlling maintenance processes in the data network 11. By way of example, the microcontroller 8 in the system management chip 5 can execute program code to provide a web interface accessed from a remote maintenance computer. The actual memory map can then be transferred from the maintenance computer to the system monitoring chip 5 using what is known as the trivial file transfer protocol (TFTP) as per RFC 1350, for example.

Subsequently or in parallel with the downloading of the memory map, the downloaded memory map or portions thereof is/are stored in the graphics memory 13 in step S30. This involves the data being transferred to the graphics memory 13 in the graphics component 7 via the expansion bus 16, the system management bus 17 or another suitable connection such as an internal bus in an intelligent server management controller.

Depending on the scope of the memory map to be downloaded, steps S20 and S30 can take between a few seconds and several hours. However, in this phase of the method 20, it is not necessary for the processors 2a and 2b or the chipset 3 and the memory modules 4a and 4b to be supplied with an operating voltage. The memory map can therefore be downloaded particularly in a quiescent or energy-saving mode of the computer system 1, and the download thus caters for an improved energy balance.

After the memory map has been downloaded completely and stored in the graphics memory 13, the system management chip 5 activates the remainder of the components arranged on the main board of the computer system 1. In particular, the processors 2a and 2b, the chipset 3 and the memory modules 4a and 4b are subsequently supplied with an operating voltage. Alternatively, the subsequent steps can also be executed by a user when the computer system 1 is next switched on.

Application of an operating voltage to all the essential components of the computer system 1 results in activation and execution of a piece of system firmware in the computer system 1 in step S40 by at least one of the processors 2a and 2b. By way of example, the chipset 3 retrieves a BIOS program stored in the nonvolatile memory 12 or a system firmware component 12a, and the processor 2a executes it.

In a subsequent step S50, the memory map stored in the graphics memory 13 is copied from the system firmware 12a to the main memory 4 provided by the memory modules 4a and 4b.

Since both the graphics memory 13 and the memory modules 4a and 4b connect by powerful bus systems 16 and 15 to the chipset 3 and by the latter indirectly to the processors 2a and 2b, it is also possible to copy a high volume of data in a very short time. By way of example, a memory map having a data volume of approximately four megabytes can be copied from the graphics memory 13 to the memory modules 4a and 4b in significantly less than one second. For a user of the computer system 1, there is therefore no or only a barely perceptible delay in the starting process when starting. At any rate, the period of time is significantly reduced in comparison with the period of time which would be needed for the memory map to be downloaded via the system firmware 12a itself.

If the graphics memory 13 in common with the main memory 4 is provided by the same physical memory modules 4a and 4b, the copying can also be replaced by reassignment of individual memory blocks of the memory modules 4a and 4b to the main memory 4 and to the graphics memory 13.

In a final method step S60, a utility program which the memory map contains is executed by one of the processors 2a and 2b. By way of example, the memory map may contain an image of a bootable data storage medium from which the BIOS program or the system firmware component 12a of what is known as the extended firmware interface boots following the conclusion of the copying in step S50. Utility programs which the map contains and hence any linked data are then automatically executed or loaded.

In one preferred example, the utility program is a utility program that updates a firmware component 12a or 12b of the computer system. In this case, the utility program can check whether and possibly which data updates the firmware components 12a and 12b of the computer system 1 are present in the transferred memory map. To this end, the memory map may particularly also contain a script or other configuration data, which makes an update dependent on the specific system configuration of the computer system 1. In this case, a general memory map can be transferred to all the computers in a company network, for example. Subsequently, individual items, all or else none of the transferred data that updates the firmware components 12a and 12b of the individual computer systems 1 can be programmed into the nonvolatile memory 12 or other nonvolatile memory units of the computer systems 1 on the basis of the system configuration thereof.

FIG. 3 shows the temporal sequence of a method 30 of updating a firmware component 12a or 12b in detail. The lower area shows the activity of the system management chip 5. The upper area shows the activity of the system firmware 12a on the main board of the computer system 1. The system firmware 12a is a piece of firmware based on the unified extended firmware interface (UEFI).

In a first step S11, the system management chip 5 is activated. In a subsequent step S12, the system management chip 5 initializes the graphics memory 13.

In a subsequent step S21, a web interface that updates a firmware component 12a or 12b provided by the system management chip 5 is called. A remote computer can set appropriate parameters to update the firmware and download the memory map. If the process is subsequently initiated by confirmation from an appropriate control element, a subsequent step S22 involves a memory map provided by the maintenance computer being transferred by TFTP and stored directly in the graphics memory 13.

Preferably, the memory map comprises the image of a bootable data storage medium comprising a utility program that updates the firmware component 12a or 12b and the further data required by the utility program to update the firmware component 12a or 12b. In particular, the map comprises updated firmware components 12a' and 12b' for the system firmware 12a or other system components 12b.

Preferably, the memory map is transferred in packed form between the maintenance computer and the system management chip 5. In this case, the term "packed" covers both the mere combination of various files to form a uniform datablock or archive file and the optional compression of the data to reduce the volume of the transferred data.

After the transfer of the memory map has concluded, the main board of the computer system 1 with the components held thereon is put into an operating state. On the basis of the UEFI standard, a step S41 first of all involves execution of what is known as a pre-EFI initiation (PEI) procedure. In the PEI, basic functions are provided to execute individual firmware components.

In what is known as the driver execution environment (DXE) of the UEFI firmware, a step S51 subsequently involves performance of temporary PCI initialization by the system firmware 12a to set up a connection to the graphics memory 13. To this end, the example involves the expansion bus 16 being initialized for data retrieval from the separate graphics memory 13 of a PCI graphics component 7. The memory map may be retrieved from an integrated memory in an intelligent server management controller. In a subsequent step S52, the memory map stored in the graphics memory 13 is transferred from the system firmware 12a to the main memory 4.

Subsequently, a step S53 involves complete initialization of the expansion bus 16 taking place. Only after complete initialization of the expansion bus 16 in step S53 is the graphics memory 13 or the graphics component 7 initialized with the result that they are available for subsequent operation of the computer system 1. A step S54 involves a further firmware component of the graphics component 7 being started for this purpose. The further firmware component is used to make functions of the graphics component 7, particularly the available graphics mode, accessible to the expanded firmware interface. Only then are status reports and other information from the computer system 1 output via the graphics component 7.

Once all hardware drivers have been initialized by execution of the relevant firmware components, the system firmware 12a unpacks the transferred memory map in step S61 and boots a special boot loader contained therein or a complete operating system (BS) from the decompressed memory map in the main memory 4. In the example, the operating system for its part calls, in step S62, a utility program that updates the firmware component 12a or 12b, the utility program likewise being contained in the memory map. This utility program in turn retrieves further configuration settings, scripts and/or data from the memory map to update single or all the firmware components 12a and/or 12b in the nonvolatile memory 12 or other nonvolatile memories in the computer system 1.

If the updating of the firmware components 12a and 12b requires the computer system to be restarted, this can be initiated by the utility program as a final action. The computer system then immediately boots after updating the firmware component 12a or 12b from the possibly updated system firmware 12a or 12a'.

Instead of the method of updating a firmware component 12a or 12b that is shown in detail in FIG. 3, the previously described method can also be used to execute other utility programs on a computer system, as has been described generally with reference to FIG. 2. By way of example, a memory map comprising a complete operating system executed exclusively for maintenance purposes on the computer system 1 can be transferred and activated. In this way, it is possible to use a computer system 1 usually executed with a first operating system such as Microsoft Windows to execute a second operating system such as Linux, which is not permanently installed on the computer system 1, exclusively for maintenance purposes.

It goes without saying that data other than operating systems, for example, software drivers or software components to be installed, can also be transferred to the computer system 1 in this way and executed thereon. The advantage of such a method of execution is improvement in the energy balance described above, inter alia. Furthermore, the execution of processes can be prepared in the background or in a quiescent state of the computer system 1.

The individual steps of the methods described above can have their order changed or else can be executed wholly or in part in parallel with one another insofar as the execution of a step is not dependent on the complete execution of another step. It goes without saying that individual steps of the methods can also be performed by various data processing elements such as the processors 2a and 2b.

Preferably, the methods are implemented as computer programs. Computer programs within the meaning of this description are understood in this context to mean both the source code and executable program code developed therefrom which carries out the described methods when it is executed. The computer program may, in particular, be present on a physical storage medium such as a nonvolatile memory chip, a floppy disk, CD or DVD, or can be transferred as a mere signal sequence via a data network.

The invention claimed is:

1. A method of executing a utility program on a computer system comprising 1) a processor, 2) system firmware, 3) an expansion bus, 4) a main memory that stores data for processing by the processor, 5) a graphics component comprising a graphics memory and a graphics processor, and 6) a system management chip in the form of a baseboard management controller or a remote management controller, which can be operated independently of the processor, the method comprising:
 initializing the graphics memory of the computer system,
 downloading, by the system management chip, a memory map from a data source in a data network, the memory map comprising the utility program to be executed,
 storing, by the system management chip, the memory map in the graphics memory,
 performing, by the system firmware, a temporary initialization of the expansion bus to set up a connection to the graphics memory before the memory map is copied from the graphics memory to the main memory,
 copying the memory map from the graphics memory to the main memory in the computer system,
 performing, by the system firmware, complete initialization of the expansion bus after the memory map is copied from the graphics memory to the main memory, and
 executing, by the processor, the utility program from the main memory.

2. The method according to claim 1, wherein the memory map contains an image of a bootable data storage medium with the utility program stored thereon.

3. The method according to claim 1, wherein the computer system further comprises a nonvolatile memory that stores the system firmware, and the utility program to be executed is set up to update the system firmware in the computer system, and the memory map further comprising data to update the system firmware.

4. The method according to claim 3, wherein the memory map contains an image of a bootable data storage medium with the utility program and the data to update the system firmware stored thereon.

5. The method according to claim 1, wherein the downloading involves a packed data block with compressed data of the memory map being loaded and, prior to execution of the utility program, the stored memory map being decompressed by the system firmware.

6. The method according to claim 1, wherein the computer system further comprises a graphics component comprising a firmware component that initializes the graphics component, and the step of copying is executed prior to activation of the firmware component to initialize the graphics component.

7. The method according to claim 6, wherein initializing the graphics memory and also downloading and storing the memory map are executed in a quiescent state or energy-saving mode of the computer system, in which the main memory and the processor are not supplied with an operating voltage, and copying the memory map and executing the utility program are executed in an operating state of the computer system in which the main memory and the processor are supplied with an operating voltage.

8. The method according to claim 6, wherein downloading the memory map is executed in a prior operating state of the computer system independently of the operational state of the computer system and initializing the graphics memory and storing the memory map are executed when the computer system is restarted and copying the memory map and executing the utility program are executed in an operating state of the computer system which follows the restart.

9. The method according to claim 1, wherein the computer system further comprises an intelligent server management controller, the graphics memory and the at least one system management chip are integrated in the intelligent server management controller, and, in the step of initialization, the graphics memory of an intelligent server management controller of the computer system is activated to store and copy the memory map.

10. A non-transitory computer program product comprising executable program code, wherein the program code carries out a method according to claim 1 when executed on at least one data processing element in a computer system.

11. The non-transitory computer program product according to claim 10, wherein the program code comprises a first portion for execution by a microcontroller in the system management chip and a second portion for execution by a processor that is independent thereof in a computer system.

12. A computer system comprising:
 a system firmware,
 an expansion bus,
 a first nonvolatile memory that stores a component of the system firmware,
 at least one processor that executes the system firmware,
 a main memory that stores data for processing by the at least one processor,
 a graphics component comprising graphics memory and a graphics processor, and
 at least one system monitoring chip in the form of a baseboard management controller or a remote management controller, which can be operated independently of the at least one processor and has a second nonvolatile memory that stores control program code,
 wherein the control program code initializes the graphics memory in the computer system to download a memory map comprising a utility program to be executed by the at least one processor and store said memory map in the graphics memory,
 the system firmware performs a temporary initialization of the expansion bus to set up a connection to the graphics memory before the memory map is copied from the graphics memory to the main memory, and the system firmware copies the memory map from the graphics memory to the main memory in the computer system, the system firmware performs a complete initialization of the expansion bus after the memory map is copied from the graphics memory to the main memory and executes the utility program from the main memory using the at least one processor of the computer system.

13. The computer system of claim 12, further comprising an intelligent server management controller, wherein the graphics memory and the at least one system monitoring chip are integrated in the intelligent server management controller.

* * * * *